United States Patent
Lai et al.

(10) Patent No.: US 12,545,845 B2
(45) Date of Patent: Feb. 10, 2026

(54) DECREASING HEAVY GASOIL FOULING

(71) Applicant: PHILLILPS 66 COMPANY, Houston, TX (US)

(72) Inventors: Jinfeng Lai, Bartlesville, OK (US); Leonard Nyadong, Collinsville, OK (US)

(73) Assignee: Phillips 66 Company, Houston, TX (US)

( * ) Notice: Subject to any disclaimer, the term of this patent is extended or adjusted under 35 U.S.C. 154(b) by 229 days.

(21) Appl. No.: 18/506,264

(22) Filed: Nov. 10, 2023

(65) Prior Publication Data

US 2024/0191147 A1     Jun. 13, 2024

Related U.S. Application Data

(60) Provisional application No. 63/484,896, filed on Feb. 14, 2023, provisional application No. 63/386,602, filed on Dec. 8, 2022.

(51) Int. Cl.
| | |
|---|---|
| *C10G 47/22* | (2006.01) |
| *C10G 11/00* | (2006.01) |
| *C10G 45/00* | (2006.01) |
| *G01N 24/08* | (2006.01) |
| *G01N 33/28* | (2006.01) |

(52) U.S. Cl.
CPC ............. *C10G 47/22* (2013.01); *C10G 11/00* (2013.01); *C10G 45/00* (2013.01); *G01N 24/08* (2013.01); *G01N 33/2835* (2013.01); *C10G 2300/1059* (2013.01); *C10G 2400/30* (2013.01)

(58) Field of Classification Search
CPC ............ C10G 11/00; C10G 2300/1059; C10G 2400/30; C10G 45/00; C10G 47/22; C10G 75/00; C10G 75/04; G01N 24/08; G01N 33/2835; G01R 33/4608
See application file for complete search history.

(56) References Cited

FOREIGN PATENT DOCUMENTS

| | | | | |
|---|---|---|---|---|
| CA | 2785580 A1 | * | 7/2011 | ............... B01J 35/45 |
| WO | WO-2005040313 A1 | * | 5/2005 | ......... G06Q 10/0875 |

* cited by examiner

*Primary Examiner* — Ellen M McAvoy
*Assistant Examiner* — Chantel Graham
(74) *Attorney, Agent, or Firm* — Phillips 66 Company

(57) ABSTRACT

Processes for rapidly and accurately predicting the fouling potential of a heavy petroleum fraction in a commercial refinery, informing the selection of one or more interventions to prevent or decrease the rate of said fouling. The process utilizes several specialized $^{13}C$ Nuclear Magnetic Resonance procedures to more accurately quantify tertiary and quaternary bridgehead aromatic carbon in the heavy petroleum fraction This permits more accurate calculation of a Condensation Index for the heavy petroleum fraction to more accurately predict fouling potential of the fraction. When the condensation index is at or above a threshold value, the process implements one or more responses to improve operational efficiency of the commercial refinery.

6 Claims, 10 Drawing Sheets

DECREASING HEAVY GASOIL FOULING

CROSS-REFERENCE TO RELATED APPLICATIONS

This application is a non-provisional application that claims the benefit of and priority to U.S. Provisional Application Ser. No. 63/386,602 filed Dec. 8, 2022, entitled "DECREASING HEAVY GASOIL FOULING" and U.S. Provisional Application Ser. No. 63/484,896 filed Feb. 14, 2023, entitled "DECREASING HEAVY GASOIL FOULING", which are both hereby incorporated by reference in their entirety.

STATEMENT REGARDING FEDERALLY SPONSORED RESEARCH OR DEVELOPMENT

None.

FIELD OF THE INVENTION

The present invention relates to processes for rapidly and accurately predicting the fouling potential of a heavy petroleum fraction in a commercial refinery to improve the implementation of one or more interventions that prevent or decrease the rate of said fouling.

BACKGROUND

Commercial petroleum refining has been driven by both economic incentives and regulatory requirements to improve efficiency in the production of high quality transportation fuels, including gasoline. Further improvements in refinery efficiency (e.g., transportation fuel blend component yield and FCC catalyst run length) will be achieved only by developing a more detailed understanding of the underlying reaction chemistry occurring in these upgrading processes, which in turn, is facilitated by better understanding of the molecular composition of the feedstocks and refinery intermediate streams, such as heavy gas oils that serve as feed streams for a fluidized catalytic cracking unit (FCCU). Estimates of the overall fouling potential for a given heavy gas oil feed stream are used to optimize the many variables involved in operating gas oil hydrotreaters located immediately upstream from a FCCU.

The molecular complexity of a refinery intermediate stream increases exponentially with an increase in the maximum boiling point of the feed. Thus, obtaining a fundamental understanding about the chemical composition of high boiling point gas oils is challenging. Accurate estimates of the aromatic content in a heavy gas oil can be obtained using any of several known techniques that have been extensively validated. However, more accurate characterization of the types of aromatics in the gas oil might provide more information to better predict the fouling potential of the heavy gas oil.

Accordingly, a need exists for a more rapid method that can accurately determine the fouling potential of a potential heavy gas oil feed stream. Such a method would quickly and more accurately determine the condensation index for a gas oil sample to allow accurate prediction of the fouling potential of the feed stream in the hydrotreater.

BRIEF SUMMARY OF THE DISCLOSURE

In some embodiments, the present disclosure relates to a process for decreasing fouling caused during upgrading of a feed stream comprising a heavy petroleum fraction in a refinery, comprising the steps of: a) providing a sample of a feed stream comprising a heavy petroleum fraction with a boiling point range that is in the range from 343° C. to 566° C.: b) analyzing the sample to calculate an aromatic condensation index value, wherein the aromatic condensation index is determined by: i.) performing conventional $^{13}C$ nuclear magnetic resonance spectroscopy with inverse gated $^{1}H$ decoupling on a portion of the sample to produce a first spectrum comprising resonance peaks indicative of total aromatic content; ii.) performing distortionless enhancement by polarization transfer $^{13}C$ nuclear magnetic resonance spectroscopy on a portion of the sample utilizing a selection angle of 135 degrees to produce a second spectrum comprising resonance peaks indicative of tertiary aromatic carbon content; iii.) performing a quaternary-only $^{13}C$ nuclear magnetic resonance spectroscopy on a portion of the sample to produce a third spectrum comprising resonance peaks indicative of quaternary aromatic carbon content; iv.) normalizing the sum of the second spectrum and the third spectrum to the first spectrum by fitting the sum of spectral data points for the second and third spectrum at a given chemical shift value to the value for the spectral data point for the first spectrum at the same chemical shift value, then repeating this process for each spectral data point while minimizing the total sum of residuals to produce a normalized second spectrum and a normalized third spectrum, wherein the normalization is performed for the chemical shift region of the second spectrum and the third spectrum that is associated with NMR signals for quaternary aromatic carbons and tertiary aromatic carbons; v.) integrating the first spectrum, the normalized second spectrum and the normalized third spectrum in the chemical shift range of each spectrum that is associated with NMR signals for aromatic carbons to produce values for total aromatic content, tertiary aromatic carbon content and quaternary aromatic carbon content, respectively; vi.) calculating an aromatic condensation index value for the sample by dividing the quaternary aromatic content by the total aromatic content; c) performing at least one of the following actions when the aromatic condensation index value meets or exceeds an aromatic condensation index action threshold value: i.) increasing the frequency of periodic cleaning of catalysts, reactors, conduits and heat exchangers contacted by the feed stream during the upgrading; ii.) increasing the regeneration frequency for catalysts that contact the feed stream during the upgrading; iii.) adding an additive to the feed stream in an amount sufficient to decrease the fouling rate of refinery equipment, comprising catalysts, reactors, conduits and heat exchangers contacted by the feed stream during the upgrading; iv.) decreasing at least one reaction temperature to which the feed stream, or any intermediate stream derived therefrom, is exposed during the upgrading; v.) altering the flow velocity of the feed stream or any intermediate stream derived therefrom during the upgrading; vi.) diluting the feed stream with a second feed stream that has a lower CI, where the diluting occurs at a ratio such that the CI of the resulting mixture is below the CI action threshold value, wherein the second feed stream comprises a second heavy petroleum fraction comprising a boiling point range that is the range from 343° ° C. to 566° C.; vii.) visbreaking the feed stream prior to the upgrading.

In some embodiments of the process, the heavy petroleum fraction comprises one or more of heavy gas oil, vacuum gas oil, coker gas oil and cycle oil.

In some embodiments, the aromatic condensation index action threshold value is larger than 0.211. In some embodiments, the aromatic condensation index action threshold value is in the range from 0.211 to 0.295.

In some embodiments, the conventional $^{13}$C nuclear magnetic resonance spectroscopy with inverse gated $^1$H decoupling is performed without signal enhancement by nuclear Overhauser effect.

In some embodiments, the upgrading comprises at least one of hydrotreating, hydrocracking and catalytic cracking.

BRIEF DESCRIPTION OF THE DRAWINGS

A more complete understanding of the present invention and benefits thereof may be acquired by referring to the follow description taken in conjunction with the accompanying drawings in which.

Figure 1:
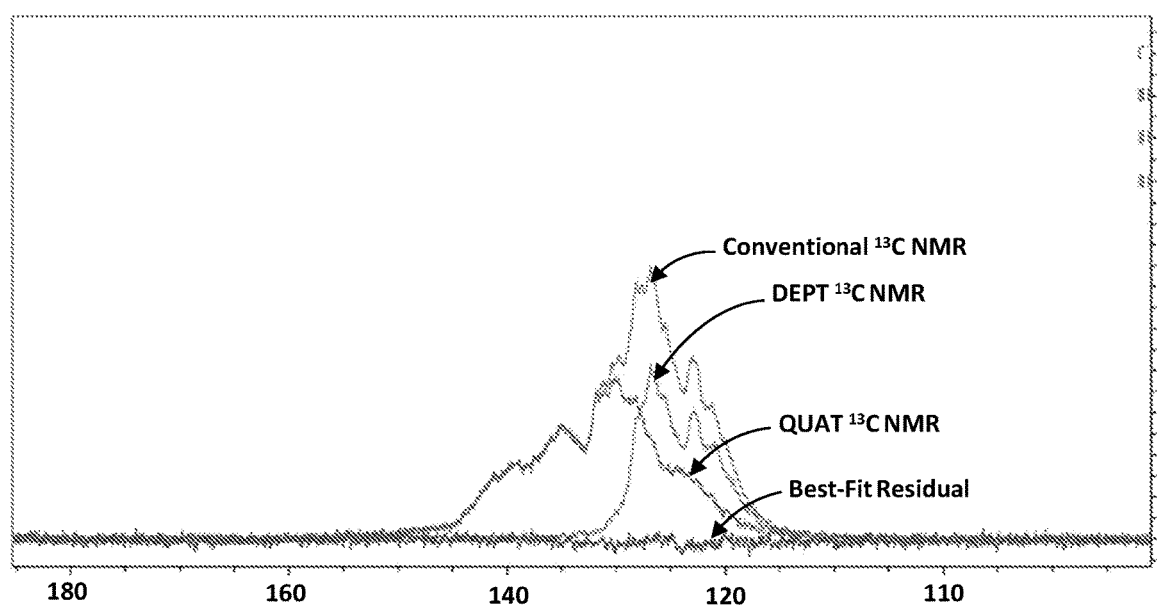
FIG. 1 depicts three different spectrums acquired using three different $^{13}$C nuclear magnetic resonance (NMR) spectrometry techniques.

The invention is susceptible to various modifications and alternative forms, specific embodiments thereof are shown by way of example in the drawings. The drawings may not be to scale. It should be understood that the drawings are not intended to limit the scope of the invention to the particular embodiment illustrated.

DETAILED DESCRIPTION

The molecular complexity of petroleum-derived streams formed during the conversion of petroleum to various products in a commercial refinery increases exponentially in direct correlation with increasing boiling point range of the intermediate stream. Therefore, obtaining fundamental compositional knowledge about these intermediate streams, including heavy gas oils, slurry oils and residual fractions is challenging. Significant effort has focused on understanding the effect of heavy gas oil composition on its propensity to cause coking and/or fouling in a commercial refinery. Fouling caused by processing and conversion of petroleum to various products such as transportation fuels, solvents and various chemicals falls into several categories, but among the most damaging in the commercial refinery setting is 1) chemical reaction fouling wherein solid carbonaceous materials deposit on an interior surface of the refining process equipment as the result of a chemical reaction at or near the metal surface; 2) corrosion fouling wherein chemicals in the petroleum (or a fraction thereof) react with a catalyst or interior surface of the refinery process equipment to form a corrosion product that remains attached to the surface.

Paraffins and naphthenes tend to crack easily to form lighter products in a fluidized catalytic cracking unit (FCCU). However, aromatic rings are more difficult to catalytically break apart, and condensed core poly-aromatic rings predominantly undergo dehydrogenation and condensation to form coke and foul catalysts and surfaces. Thus, gas oils having a higher content of complex aromatic content tend to generate undesirable increases in the rate of coke formation on process catalysts. Aromatics also are prone to thermally crack at high temperatures, leading to fouling of the interior surfaces of refinery equipment surfaces at the high temperatures utilized in certain refining processes, including refinery heat exchangers and reactors.

Conventional methods typically measure aromatic content in a gas oil feed stream using conventional $^{13}$C Nuclear Magnetic Resonance (NMR). However, there are inherent inaccuracies associated with utilizing such methods to determine the complexity of aromatic structures in a gas oil. In conventional $^{13}$C NMR spectroscopy, a significant overlapping occurs between the resonance signals produce by bridgehead aromatic carbons (bound only to other aromatic carbons) and tertiary aromatic carbons (bound to two other aromatic carbons and hydrogen). On a $^{13}$C NMR spectrum, an arbitrary chemical shift value of 129.5 ppm is often used as a compromise to roughly distinguish between the signals produced by bridgehead and tertiary aromatic carbons, respectively. This simplifies integration and quantitation of the NMR signal attributed to each type of carbon, allowing quick calculation of a Condensation Index (CI) for a sample comprising complex aromatics, where CI equals the Bridgehead Aromatic Carbons divided by the Total Aromatic Carbon (where the Total Aromatic Carbon=Bridgehead Aromatic Carbon+Tertiary Aromatic Carbon+Substituted Aromatic Carbon)

However, using an arbitrary chemical shift value (e.g., 129.5 ppm) to roughly divide the resonance signals produced by either bridgehead or tertiary aromatic carbons can lead to a pronounced underestimation of the quantity of bridgehead aromatic carbons because of significant resonance signal overlap between the bridgehead and tertiary aromatic carbons. This results in an underestimation of the CI, which can cause underestimation of the fouling potential of a given gas oil feed because we show here that increased CI correlates with the fouling potential of a gas oil.

The process disclosed here more accurately distinguishes between $^{13}$C NMR signals produced by bridgehead aromatic carbons and tertiary aromatic carbons in a petroleum-derived hydrocarbon fraction, which in some embodiments is a gas oil sample. The process quantitates tertiary aromatic carbon by a specialized NMR technique known as Distortionless Enhancement by Polarization Transfer (DEPT). In a DEPT experiment (with a 135° tip angle), the signals from methyl ($CH_3$) and methine (CH) are phased up (positive), while methylene ($CH_2$) is phased down (negative). Further, quaternary aromatic carbons provide no signal using the DEPT technique (at 135° tip angle) because of a lack of attached protons to these quaternary carbons. In contrast, the process quantifies bridgehead aromatic carbons (bound only to other carbons) using a quaternary-only carbon spectrum (QUAT) NMR technique that is familiar to those having skill in the art. Quaternary aromatic carbons show up exclusively in the QUAT experiment while signals from all other carbons, including CH, $CH_2$, and $CH_3$, are absent. Such NMR techniques are understood in the field and therefore need not be discussed in greater detail here. These two techniques allow the NMR signals from quaternary and tertiary aromatic carbon signals to be acquired separately without signal interference.

Once the two signals are obtained, a signal normalization is performed using a scaling factor for each spectrum that best fits the sum of the QUAT and DEPT signals to the portion of the conventional $^{13}C$ NMR spectrum that is attributable to aromatic carbons, with minimized residuals for all data points. A visualization of this process is shown in FIG. 1. The highest peak corresponds to total aromatic carbons by conventional $^{13}C$ NMR. The two lower peaks correspond to tertiary aromatic carbons (DEPT) and quaternary aromatic carbons (QUAT) respectively. The baseline "noise" is a plot of the best fit residual for each data point, where the minimized residual (y-axis) for each ppm data point (x-axis) is: Residual=(Conventional $^{13}C$ NMR)−(xQUAT+yDEPT), where x and y are scaling factors for the QUAT and DEPT signals that together minimize the overall residual values. Further, this normalization is optionally conducted for only a subset of the NMR spectra in the ppm range that is typically associated with NMR signals for aromatic carbon (e.g., 100 to 170 ppm). Through the normalization of fitting the sum of these two well-separated QUAT and DEPT spectrums to the overall conventional $^{13}C$ NMR spectrum, the quaternary bridgehead and tertiary aromatic carbon content are accurately scaled and quantified. This is optionally achieved utilizing commercially-available NMR software or other mathematical software after importing each NMR spectra. Using separate empirically-obtained NMR signals for each of the tertiary aromatic and bridgehead aromatic carbons eliminates potential errors introduced by the scaling factors in the signal normalization if only DEPT were utilized (rather than both DEPT and QUAT), thereby assuring accuracy.

Once a condensation index (CI) is calculated for a given petroleum-derived fraction or refinery intermediate stream, its relative fouling potential can be assessed. If the calculated CI meets or exceeds a fouling action threshold value, one or more actions can be taken in response, including:

1) More frequent cleaning maintenance (decoking) of refinery equipment, including, but not limited to reactors, conduits and heat exchangers;
2) Addition of anti-fouling additives. A wide variety of anti-fouling agents, or additives, have been developed and are utilized extensively to mitigate fouling caused by coking of refinery equipment and/or catalysts. Any known additive that is useful for this purpose can be used in conjunction with the present process. These agents typically are (but are not limited to) chemical compounds that coat and protect internal surfaces of refinery conduits, reactor vessels, heat exchangers, etc. to prevent coke from adhering to the protected surface;
3) Lowering of the reaction temperature (e.g., for hydrotreating, catalytic cracking, etc.);
4) Change in flow velocity for the petroleum-derived fraction or refinery intermediate stream;
5) Dilution with a second gas oil feed that has a lower CI, where the diluting occurs at a ratio such that the CI of the resulting mixture is below the CI action threshold value;
6) Visbreaking (or mild thermal cracking) of the gas oil feed.

The threshold CI value is generally in the range from 0.20 to 0.29, but the actual threshold value in a particular embodiment is affected by the operating conditions of the specific reactor utilized in that embodiment (e.g., temperature, pressure, space velocity, etc.) as well as the catalyst utilized.

Figure 2:
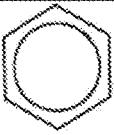
FIG. 2 is a table of calculated condensation index values for representative aromatic structures.

FIG. 2 shows that gas oils with a CI of approximately 0.2 comprise aromatics that on average have two aromatic rings. Experimental data presented herein that a gas oil with a CI of 0.212 has a low fouling potential. In contrast, FIG. 2 shows that gas oils with a CI of approximately 0.286 comprise aromatics that on average have three aromatic rings (see Table 1). Experimental data presented herein demonstrates that a gas oil with a CI of 0.295 has a high fouling potential. Thus, the threshold value for CI of a gas oil that causes significant fouling falls in the range from 0.212-0.295.

In some embodiments, the threshold CI value is in the range from 0.21 to 0.29. In some embodiments, the threshold CI value is in the range from 0.21 to 0.28. In some embodiments, the threshold CI value is in the range from 0.21 to 0.27. In some embodiments, the threshold CI value is in the range from 0.21 to 0.26. In some embodiments, the threshold CI value is in the range from 0.21 to 0.25. In some embodiments, the threshold CI value is in the range from 0.21 to 0.24. In some embodiments, the threshold CI value is in the range from 0.21 to 0.23. In some embodiments, the threshold CI value is in the range from 0.21 to 0.22. In some embodiments, the threshold CI value is in the range from 0.212 to 0.295. In some embodiments, the threshold CI value is greater than 0.211. In some embodiments, the threshold CI value is 0.295. In some embodiments, the threshold CI value is 0.28. In some embodiments, the threshold CI value is 0.27. In some embodiments, the threshold CI value is 0.26. In some embodiments, the threshold CI value is 0.25. In some embodiments, the threshold CI value is 0.24. In some embodiments, the threshold CI value is 0.23. In some embodiments, the threshold CI value is 0.22.

EXAMPLES

The following examples seek to demonstrate embodiments or certain aspects of the inventive process. While each example may illustrate a specific embodiment, the scope of the invention is not intended to be limited to any specific embodiments disclosed herein.

Example 1

Figure 3:
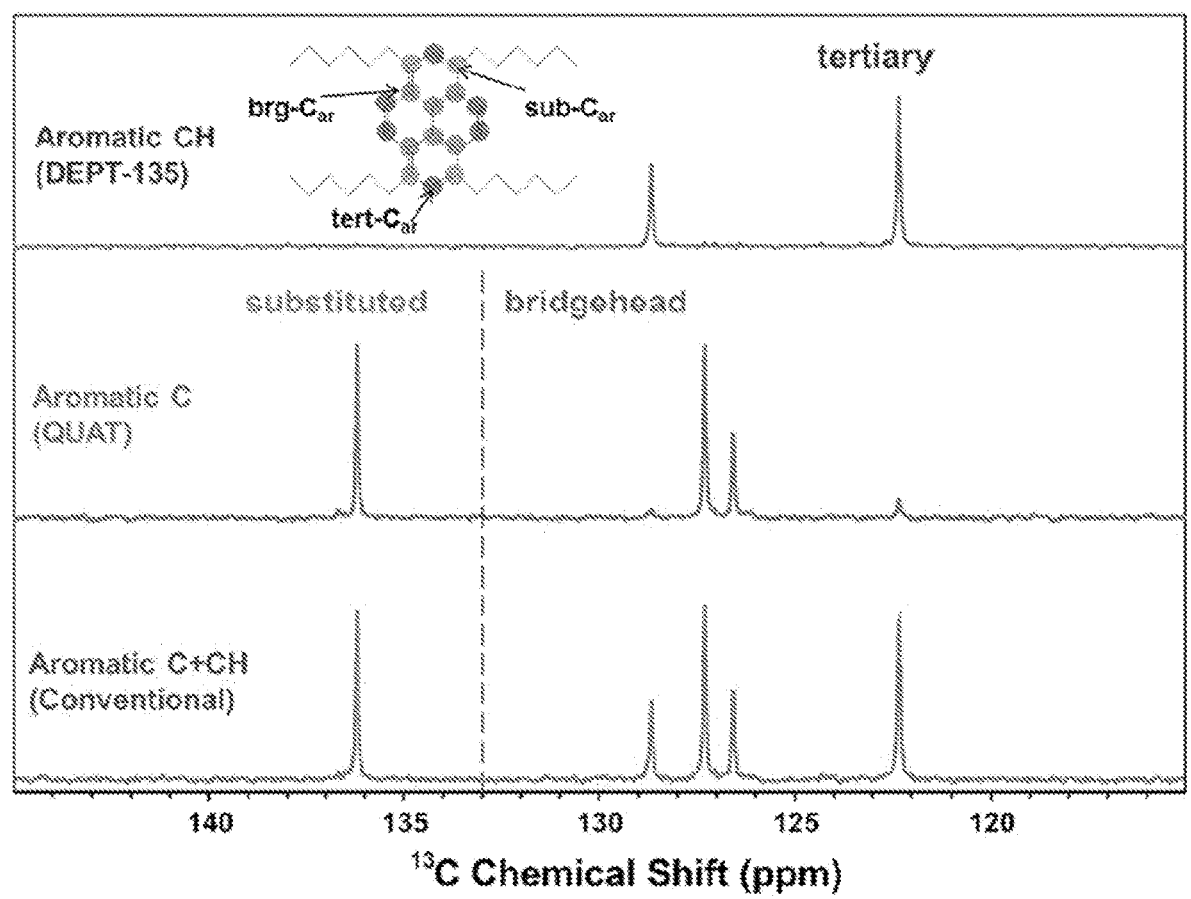
FIG. 3 depicts NMR spectrums obtained by three different NMR techniques for a first polyaromatic chemical structure.

A first example demonstrates the accuracy of the described process, which distinguishes $^{13}C$ NMR signals from bridgehead aromatic carbons and tertiary aromatic carbons (bound to two aromatic carbons and a proton) for a first complex aromatic compound 1,3,6,8-tetrahexylpyrene ("1,3,6,8-THP"). FIG. 3 shows three different $^{13}C$ NMR spectra for this compound. FIG. 3 (top spectrum) depicts a spectrum acquired using the DEPT-135 variation of $^{13}C$ NMR that detects tertiary aromatic carbons. FIG. 3 (middle spectrum) depicts a spectrum acquired using the QUAT variation of $^{13}C$ NMR that only detects quaternary aromatic carbons, where the signals acquired from substituted aromatic carbons and bridgehead aromatic carbons. FIG. 3 (bottom spectrum) depicts a spectrum acquired using conventional $^{13}C$ NMR that detects all aromatic carbons. The signals acquired using DEPT-135 and QUAT techniques were normalized to the scale of the conventional $^{13}C$ NMR spectrum.

NMR spectra were obtained on a Bruker Advance III HD 400 NMR spectrometer, operating at 400.16 MHz for proton ($^{1}H$), and 100.04 MHz for carbon ($^{13}C$). An enhanced 2G Digital Quadrature Detection Receiver (RXAD/2) with integrated high-performance ADCs (analog-to-digital converter, or digitizer) was utilized to provide the highest dynamic range, high digital resolution and large bandwidth digital filtering. The amplifier utilized was a Bruker BLAXH500/100 amplifier at 500 Watt linear pulse power for $^{13}C$ channel. The probe utilized was a Bruker Multinuclear Broadband Fluorine Observe (BBFOPLUS) probe (5 mm sample diameter).

Chloroform-d (with Iron (III) trifluoroacetylacetonaste as a relaxation agent) was used as a solvent, allowing recycle delay to be set as low as 5 sec, thereby minimizing the time required to conduct the 2048 scans necessary to quantitate quaternary carbons. Samples were run at 50° C. Tetramethylsilane (TMS) was used as an internal chemical shift reference (0 ppm) for $^{13}C$ NMR. All chemical shifts are reported in ppm relative to trimethylsilane (TMS) standard. Two thousand and forty-eight scans were acquired for $^{13}C$ NMR and averaged.

Figure 4:
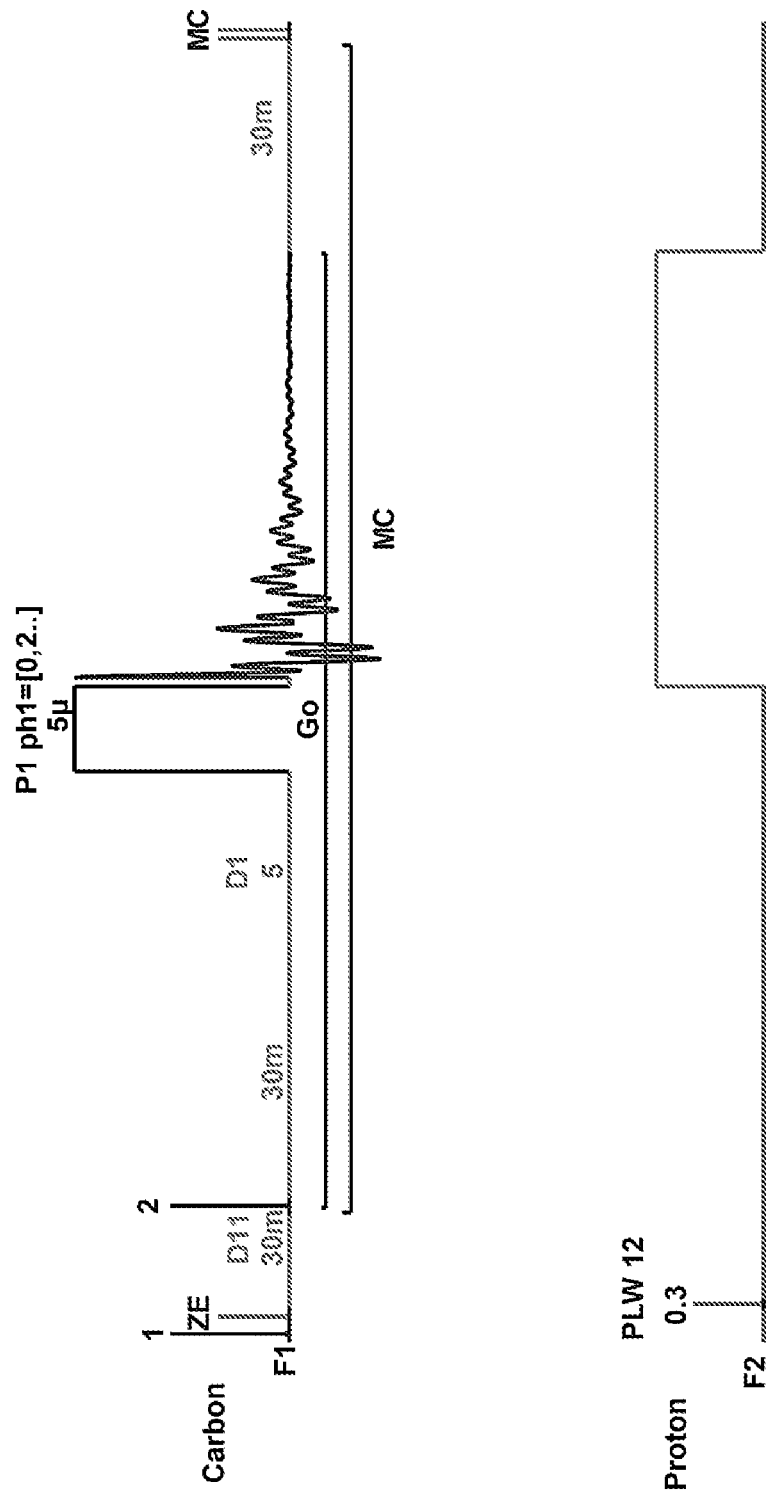
FIG. 4 depicts the parameters used for the conventional $^{13}$C NMR pulse sequence.
Figure 5:
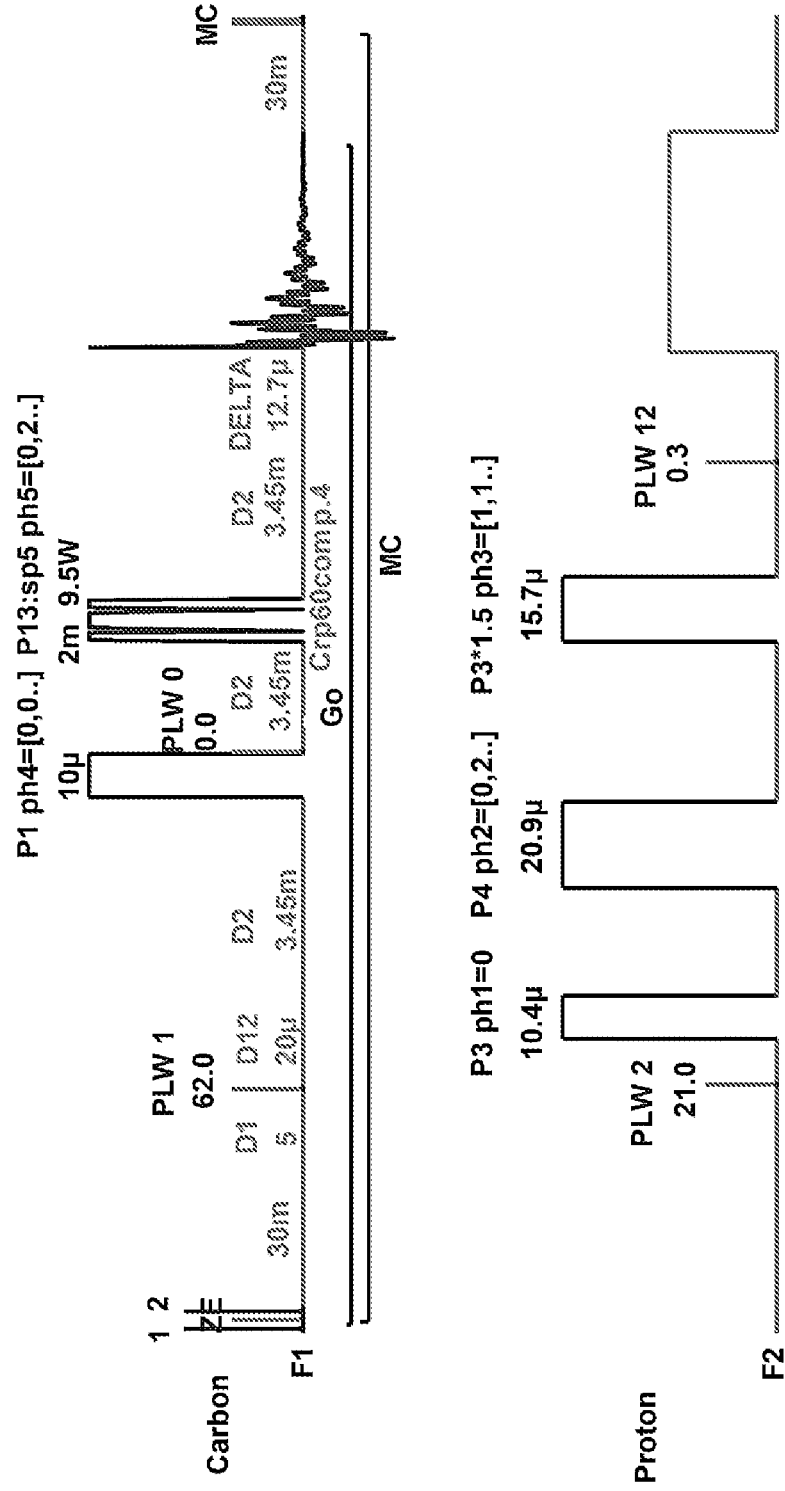
FIG. 5 depicts the parameters used for the DEPT-135 NMR pulse sequence.

The detailed parameters used for "Inverse Gated Pulse Sequence" (ZGIG) Conventional Quantitative $^{13}C$ NMR Pulse Sequence are illustrated by the diagram of FIG. 4, and were designed to include a) a relaxation period (D1) to achieve a pre-equilibrium state; b) a carbon pulse (P1) to create transverse magnetization that is further acquired during acquisition time; c) a proton decoupling that is only applied during the acquisition period, such that no polarization transfer from $^1H$ to $^{13}C$ occurs (i.e., via nuclear Overhauser effect). Accordingly, the resulting $^1H$-decoupled carbon spectrum can be used for quantitative purposes. The specific settings were as follows:

Carbon Channel Parameters:
  PLW1—$^{13}C$ Power Level: 62 Watt
  P1—90° pulse on carbon: 10 microseconds
Proton Channel Parameters:
  PLW2—$^1H$ Power Level: 21 Watt
  CPDPRG 2—$^1H$ Decoupling program: waltz16
  PLW 12—$^1H$ Power Level for decoupling: 0.28 Watt
  PCPD2—90° pulse for decoupling sequence: 90 microseconds
General Parameters:
  Total acquisition time: ~3.5 hours
  Scan: 2048 scans
  D1—Recycle Delay: 5 seconds The detailed parameters used for the DEPT-135 NMR pulse sequence are illustrated by the diagram of FIG. 5 and were designed to include: a) a relaxation period (D1) to achieve a pre-equilibrium state; b) a 90° $^1H$ pulse (P1) to create transverse $^1H$ magnetization; c) an evolution delay optimized to ½ J time period to achieve antiphase proton magnetization; d) simultaneous 180° 1H and 90° $^{13}C$ pulses. The proton pulse refocused $^1H$ chemical shift evolution. The carbon pulse was applied to create multiple quantum coherences. After a second ½ J time period delay, a simultaneous 135° pulse on the $^1H$ channel and 90-degree pulse on $^{13}C$ channel were performed. The carbon pulse refocused $^{13}C$ chemical shift evolution while the 135° proton pulse was applied to create a different functional dependence as a function of carbon multiplicity, where:

Primary Carbon, $CH_3$, is proportional to 8 sin (135°) cos 2(135)°
  Secondary carbon, $CH_2$, is proportional to 4 sin (135°) cos (135°)
  Tertiary carbon, CH, is proportional to 2 sin (135)°

A final ½ J time period evolution delay was used to achieve in-phase $^{13}C$ magnetization. The $^{13}C$ magnetization was then acquired with broadband proton decoupling.

Figure 6:
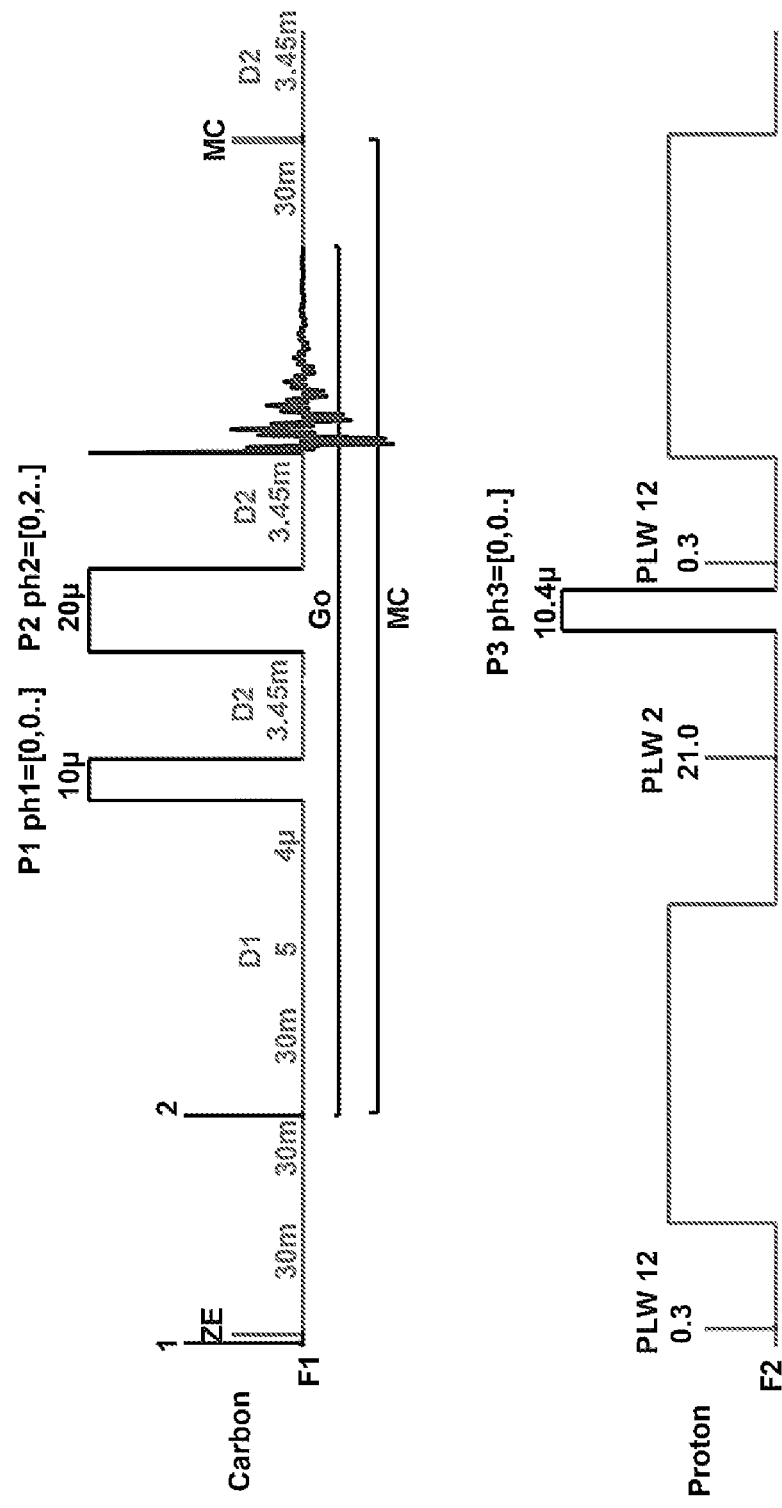
FIG. 6 depicts the parameters used for the QUAT NMR pulse sequence.

The specific settings were as follows:
Carbon Channel Parameters:
  PLW1—$^{13}C$ Power Level: 62 Watt
  P1—90° pulse on carbon: 10 microseconds
  SPW5—$^{13}C$ Shape Pulse Power Level: 9.5 Watt
  SPNAM 5—Shape Pulse: Crp60comp.4
  P13—180° pulse on carbon: 2000 microseconds
Proton Channel Parameters:
  PLW2—$^1H$ Power Level: 21 Watt
  P3—90° pulse on proton: 10.45 microseconds
  P4—180° pulse on proton: 20.9 microseconds
  135° pulse on proton: 15.7 microseconds
  CPDPRG 2—$^1H$ Decoupling program: waltz16
  PLW12—$^1H$ Power Level for decoupling: 0.28 Watt
  PCPD2—90° pulse for decoupling sequence: 90 microseconds
General Parameters:
  Total acquisition time: ~3.5 hours.
  Scan: 2048 scans
  D1—Recycle Delay: 5 seconds
  J Coupling between $^{13}C$ and $^1H$: 145 Hz
  D2—½ J time period: 3.45 microseconds
  D12—Delay for power switching: 20 microseconds
  DELTA—Delay to compensate for chemical shift evolution: 12.7 microseconds The detailed parameters used for the QUAT NMR pulse sequence are illustrated by the diagram of FIG. 6, and were designed to include: a) a spin-echo NMR pulse to generate an NMR spectrum visualizing quaternary carbon only; b) a first 90° $^{13}C$ pulse to create transverse magnetization; c) magnetization vector components that process in the transverse plane in the first ½ J time period, while non-quaternary carbon groups are 180 degree out-of-phase; d) a 180 degree pulse (between two ½ J time periods) on carbon channel to refocus chemical shift; e) a 90 degree pulse applied on the proton channel at the mean time, which causes each vector component of non-quaternary carbon magnetization to split into new additional components which process as usual in the second ½ J time period, but mutually cancel (because for every component there is an equal and opposite signal). The result is the acquisition of an NMR spectrum displaying only quaternary carbon signals, while all non-quaternary carbon signals are not detected.

The specific QUAT NMR settings were as follows:
Carbon Channel Parameters:
  PLW1—$^{13}C$ Power Level: 62 Watts
  P1—90° pulse on carbon: 10 microseconds
  P2—180° pulse on carbon: 20 microseconds
Proton Channel Parameters:
  PLW2—$^1H$ Power Level: 21 Watts
  P3—90° pulse on proton: 10.45 microseconds
  CPDPRG 2—$^1H$ Decoupling program: waltz16
  PLW 12—$^1H$ Power Level for decoupling: 0.28 Watts
  PCPD2—90° pulse for decoupling sequence: 90 microseconds
General Parameters:
  Total acquisition time: ~3.5 hours.
  Scan: 2048 scans
  D1—Recycle Delay: 5 seconds
  J Coupling between $^{13}C$ and $^1H$: 145 Hz
  D2—½ J time period: 3.45 microseconds Referring again to FIG. 3, the top panel shows the chemical structure for 1,3,6,8-THP adjacent to the $^{13}C$ NMR spectrum for this compound acquired by the DEPT technique (as described in detail above). The spectrum shows two peaks corresponding the signal obtained solely from tertiary aromatic carbons (i.e., carbons bound to two other aromatic carbons and a proton). The signal from quaternary aromatic carbons is absent in DEPT spectrum due to the lack of attached protons. In FIG. 3 (middle spectrum), the spectrum acquired by the QUAT technique shows a single peak at about 136 ppm corresponding to the signal obtained from substituted aromatic carbons (i.e., bound to two aromatic carbons and an alkyl chain) and a pair of easily distinguishable peaks located at approximately 126.5 ppm and 127.5 ppm that correspond to the resonance signal obtained from bridgehead aromatic carbons (i.e., bound to three other aromatic carbons). Signals from all other types of carbon are absent in this spectrum. This allows signals for tertiary aromatic and quaternary aromatic carbons to be obtained separately, thereby avoiding potential overlap between the spectral peaks provided by each. Finally, in FIG. 3 (bottom spectrum), conventional $^{13}$C Carbon NMR was performed to simultaneously obtain peaks corresponding to both tertiary aromatic and quaternary aromatic carbons.

The peaks corresponding tertiary and bridgehead quaternary aromatic carbon, respectively, were integrated and the sum of these two values was scaled to the aromatic carbon intensities obtained from conventional $^{13}$C NMR spectroscopy, which shows signals from both quaternary aromatic carbon and tertiary aromatic carbons. Through the normalization of fitting the sum of these two well-separated signals to the overall conventional $^{13}$C NMR signal, the quaternary and tertiary aromatic carbon content was accurately quantified.

Table 1 depicts the theoretical values and experimentally obtained values for the fraction of quaternary aromatic carbons, the fraction of tertiary aromatic carbons, the Condensation Index (CI), and the Substitution Index for 1,3,6,8-THP.

TABLE 1

Theoretical and experimentally-derived aromatic structural properties for the pure compound 1,3,6,8-THP.

| Aromatic Structural Property | Theoretical Value | Experimental Value |
|---|---|---|
| Quaternary Carbon Fraction | 0.625 | 0.628 |
| Tertiary Carbon Fraction | 0.375 | 0.372 |
| Condensation Index | 0.375 | 0.374 |
| Substitution Index | 0.250 | 0.254 |

The data in Table 1 shows that the NMR method described herein was highly accurate for estimating all values, including the CI. Since CI is directly correlated to fouling propensity, the methods described herein rapidly and accurately estimate fouling propensity, and as a consequence, enable better decision making regarding the implementation of appropriate interventions (as needed) to prevent or decrease fouling caused by a heavy petroleum fraction feed stream.

Example 2

Figure 7:
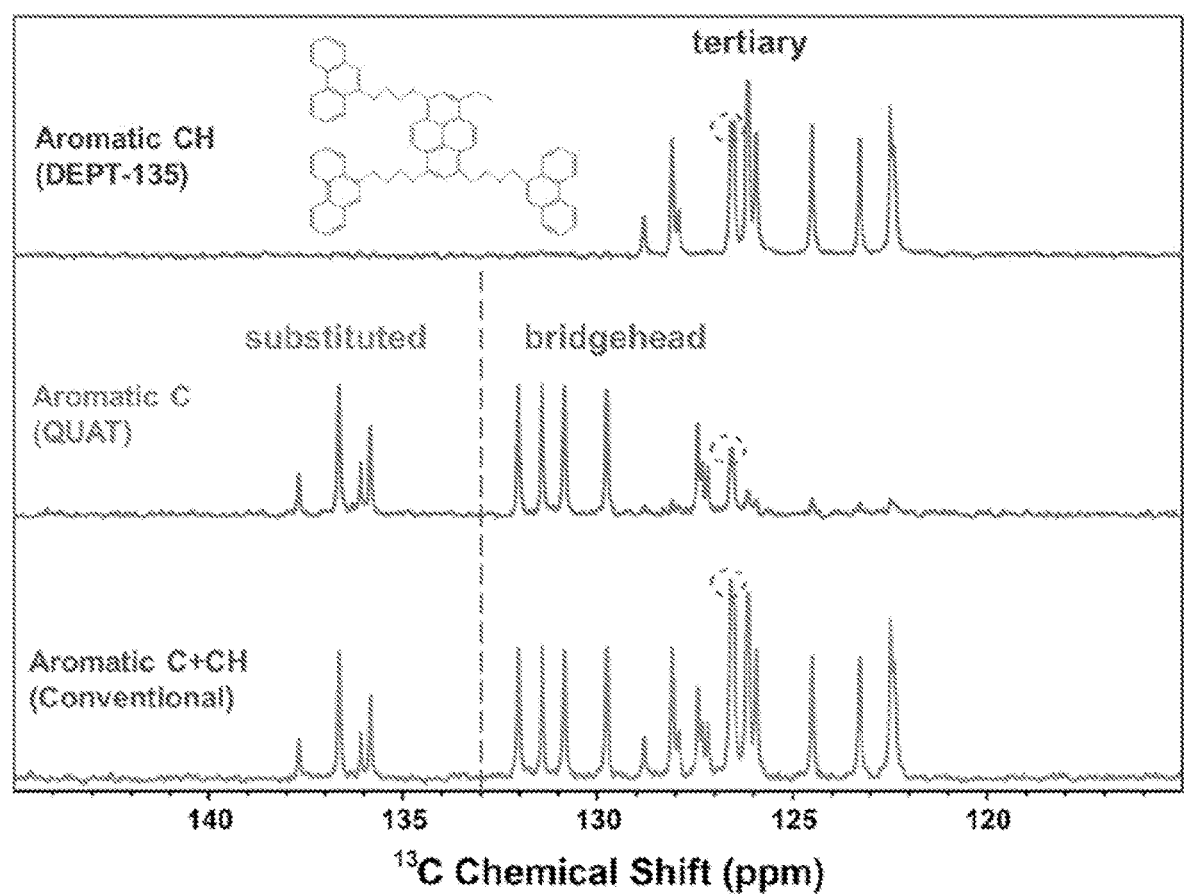
FIG. 7 depicts NMR spectrums obtained by three different NMR techniques for a second polyaromatic chemical structure.

A second example demonstrates the accuracy of the described process in clearly distinguishing $^{13}$C NMR signals from bridgehead aromatic carbons and tertiary aromatic carbons for a second complex aromatic compound 1-ethyl-3,6,8-tris(4-(phenanthrene-9-yl)butyl)pyrene ("EPBP"). NMR was conducted as explained in Example 1. FIG. 7 depicts three different $^{13}$C NMR spectra for this second aromatic compound. FIG. 7 (top spectrum) depicts a chemical structure for EPBP, and an NMR spectrum acquired using the DEPT-135 variation of $^{13}$C NMR that detects tertiary aromatic carbons. FIG. 7 (middle spectrum) depicts a spectrum acquired using the QUAT variation of $^{13}$C NMR that only detects quaternary aromatic carbons, where the signals acquired from substituted aromatic carbons and bridgehead aromatic carbons. FIG. 7 (bottom spectrum) depicts a spectrum acquired using conventional $^{13}$C NMR that detects all aromatic carbons. The signals acquired using DEPT-135 and QUAT techniques were normalized to the scale of the conventional $^{13}$C NMR spectrum.

Table 2 depicts the theoretical values and experimentally obtained values for the fraction of quaternary aromatic carbons, the fraction of tertiary aromatic carbons, the Condensation Index (CI), and the Substitution Index for EPBP.

TABLE 2

Theoretical and experimentally-derived aromatic structural properties for the pure compound EPBP.

| Aromatic Structural Property | Theoretical Value | Experimental Value |
|---|---|---|
| Quaternary Carbon Fraction | 0.455 | 0.454 |
| Tertiary Carbon Fraction | 0.545 | 0.546 |
| Condensation Index | 0.327 | 0.330 |
| Substitution Index | 0.127 | 0.124 |

The data shows that the NMR method described herein was highly accurate for estimating all values, including the CI for EPBP. Since CI is directly correlated to fouling propensity, the methods described herein rapidly and accurately estimate fouling propensity, and as a consequence, enable better decision making regarding the implementation of appropriate interventions (as needed) to prevent or decrease fouling caused by a heavy petroleum fraction feed stream.

Example 3

A third example demonstrates a difference in fouling propensity for two different samples of heavy coker gas oil (HCGO), and how that relates to measurements of CI. Each sample was obtained from a different commercial petroleum refinery. Each HCGO gas oil sample was hydrotreated using a trimetallic NiCoMo catalyst KF-907 (Albemarle). Prior to activity testing, the catalyst was chopped and sieved to 14/18 mesh. 25 cc of the catalyst was diluted with 46 cc of 30/40 mesh grit alundum and dense loaded into a fixed bed reactor using a wet-packing method. The catalyst was sulfided in situ using straight run distillate spiked with dimethyl disulfide. Catalyst activity tests were conducted at a reaction temperature while maintaining a temperature of 625° F., 650° F. or 675° F. (as shown in FIG. 3), an $H_2$ pressure of 800 psig, a liquid hourly space velocity (LHSV) of 1.34, a treat gas (hydrogen to oil) ratio of 2128 scf/b.

Figure 8:
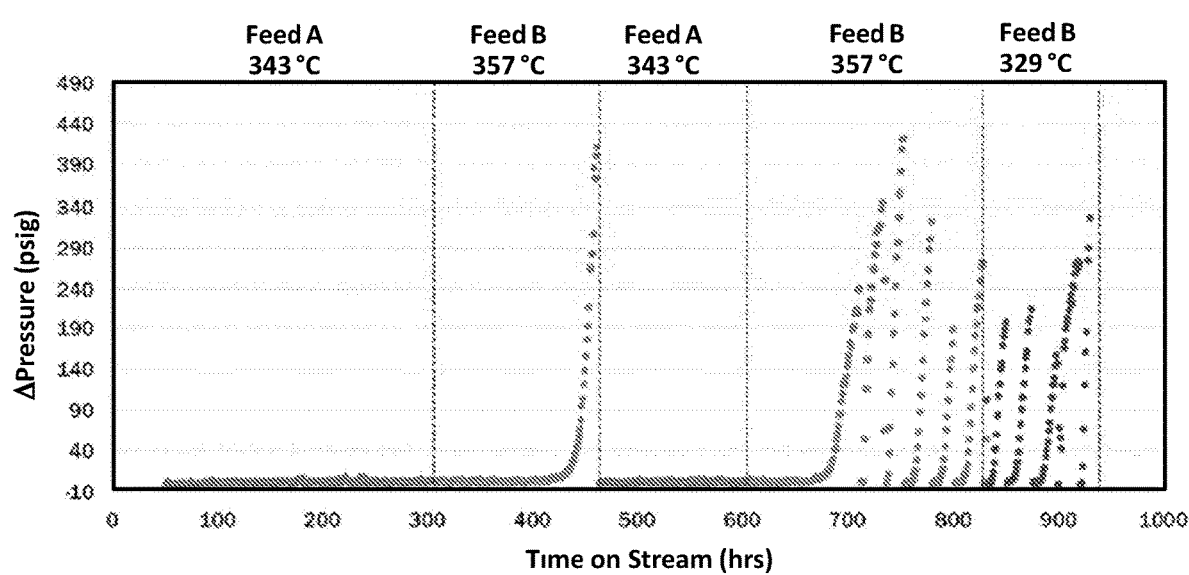
FIG. 8 depicts a graph showing pressure change over time during hydrotreatment of two different heavy coker gas oils.

The hydrotreating unit was started up successfully with HCGO Feed A and run continuously. FIG. 8 shows a graph of pressure increase over time in the test hydrotreating unit. The HCGO Feed A ran for times up to 600 hrs without any pressure increase that would indicate fouling of the catalyst bed. However, within 150 hours after switching from hydrotreatment of HCGO Feed A to HCGO Feed B, a rapid increase in pressure up to 400 psig was observed that was found to be due to coking of the catalyst.

Figure 9:
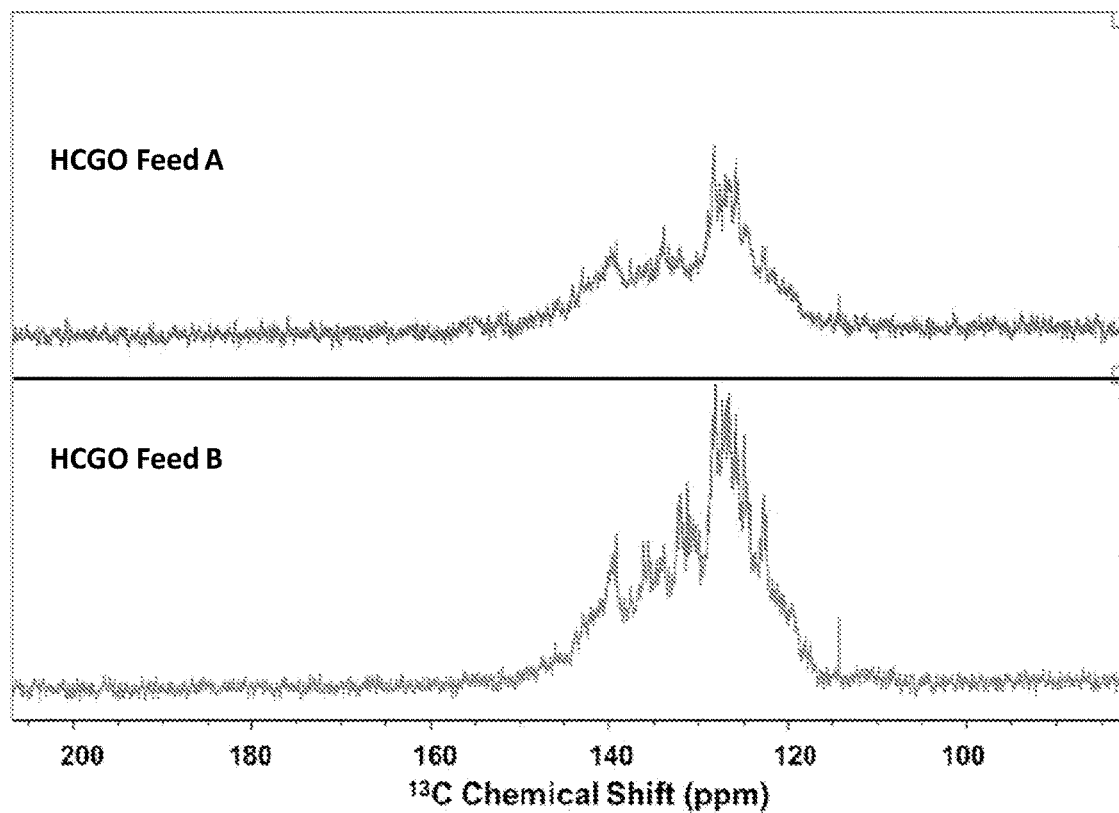
FIG. 9 depicts two spectrums acquired using conventional $^{13}$C NMR spectrometry.

FIG. 9 shows a conventional $^{13}$C NMR spectrum obtained for both HCGO Feed A (FIG. 9, top spectrum) and HCGO Feed B (FIG. 9, bottom spectrum). The region of the spectrum shown in FIG. 9 corresponds to resonance produced by aromatics (from approximately 110 ppm to 160 ppm). By qualitative assessment, HCGO Feed B appeared to have a larger quantity of aromatics (in the approximate region from 130-150 ppm). However, quantitatively measuring the CI for this feed would be imprecise using this spectrum due to apparent signal overlap between bridgehead aromatic carbons and tertiary aromatic carbons.

Figure 10:
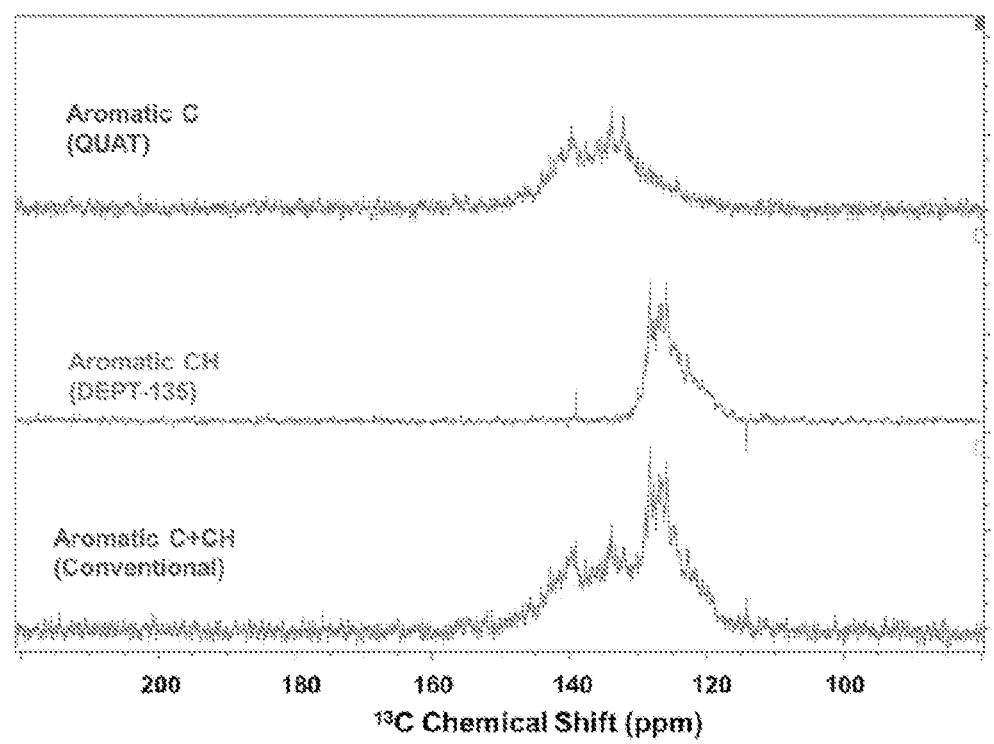
FIG. 10 depicts $^{13}$C NMR spectrums acquired by three different methods for each of two different heavy coker gas oils.
Figure 10:
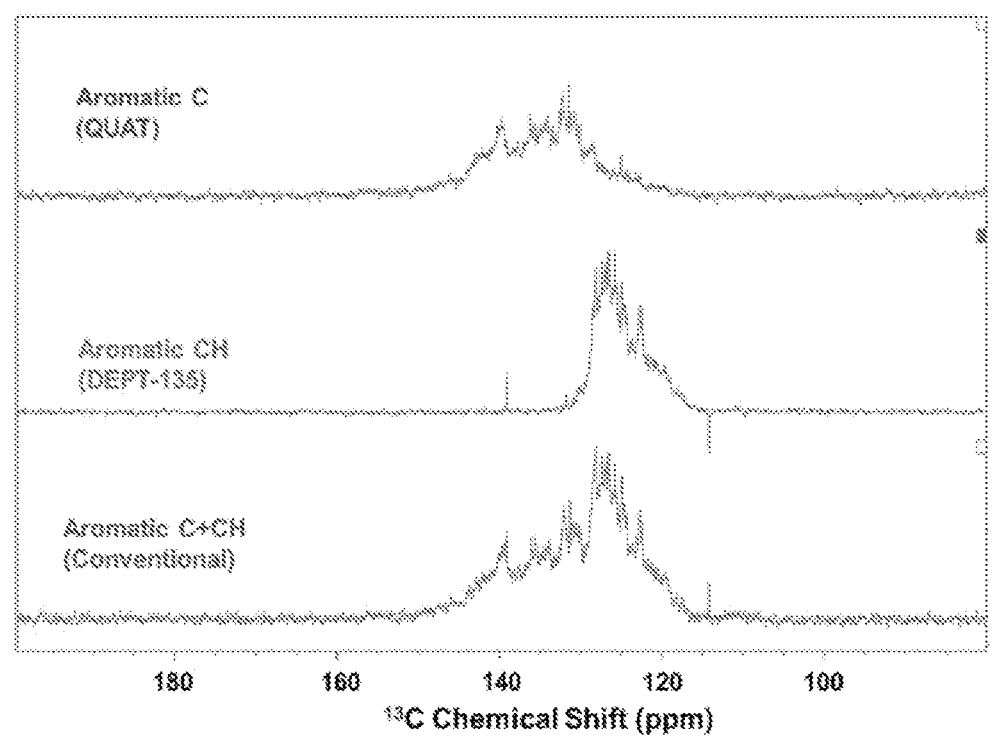

FIG. 10 depicts spectral analysis for both HCGO Feeds using the inventive NMR method described herein, which allows precise calculation of the CI for each. FIG. 10A depicts HCGO Feed A analyzed by the QUAT method (top spectrum), the DEPT-135 method (middle spectrum) and conventional $^{13}$C NMR (bottom spectrum). FIG. 10B depicts HCGO Feed B analyzed by the QUAT method (top spectrum), the DEPT-135 method (middle spectrum) and conventional $^{13}$C NMR (bottom spectrum).

By quantitating each species of carbon from the normalized spectra according to the method described herein, the CI was calculated for both HCGO Feeds. HCGO Feed A was calculated to have a CI=0.211, whereas HCGO Feed B was calculated to have a CI=0.295. The higher CI for HCGO Feed B correlated strongly with the increased fouling potential of HCGO Feed B, although there clearly is a threshold CI value for a feed (that is at least 0.211) at which no significant fouling is observed.

We claim:

1. A process for decreasing fouling caused during upgrading of a feed stream comprising a heavy petroleum fraction in a refinery, comprising the steps of:
   a. providing a sample of a feed stream comprising a heavy petroleum fraction with a boiling point range that is in the range from 343° C. to 566° C.:
   b. analyzing the sample to calculate an aromatic condensation index value, wherein the aromatic condensation index is determined by:
      i. performing conventional $^{13}$C nuclear magnetic resonance spectroscopy with inverse gated $^1$H decoupling on a portion of the sample to produce a first spectrum comprising resonance peaks indicative of total aromatic content;
      ii. performing distortionless enhancement by polarization transfer $^{13}$C nuclear magnetic resonance spectroscopy on a portion of the sample utilizing a selection angle of 135 degrees to produce a second spectrum comprising resonance peaks indicative of tertiary aromatic carbon content;
      iii. performing a quaternary-only $^{13}$C nuclear magnetic resonance spectroscopy on a portion of the sample to produce a third spectrum comprising resonance peaks indicative of quaternary aromatic carbon content;
      iv. normalizing the sum of the second spectrum and the third spectrum to the first spectrum by fitting the sum of spectral data points for the second and third spectrum at a given chemical shift value to the value for the spectral data point for the first spectrum at the same chemical shift value, then repeating this process for each spectral data point while minimizing the total sum of squared residuals to produce a normalized second spectrum and a normalized third spectrum, wherein the normalization is performed for the chemical shift region of the second spectrum and the third spectrum that is associated with NMR signals for quaternary aromatic carbons and tertiary aromatic carbons;
      v. integrating the first spectrum, the normalized second spectrum and the normalized third spectrum in the chemical shift range of each spectrum that is associated with NMR signals for aromatic carbons to produce values for total aromatic content, tertiary aromatic carbon content and quaternary aromatic carbon content, respectively;
      vi. calculating an aromatic condensation index value for the sample by dividing the quaternary aromatic content by the total aromatic content;
   c. performing at least one of the following actions when the aromatic condensation index value meets or exceeds an aromatic condensation index action threshold value:
      i. increasing the frequency of periodic cleaning of catalysts, reactors, conduits and heat exchangers contacted by the feed stream during the upgrading;
      ii. increasing the regeneration frequency for catalysts that contact the feed stream during the upgrading;
      iii. adding an additive to the feed stream in an amount sufficient to decrease the fouling rate of refinery equipment, comprising catalysts, reactors, conduits and heat exchangers contacted by the feed stream during the upgrading;
      iv. decreasing at least one reaction temperature to which the feed stream, or any intermediate stream derived therefrom, is exposed during the upgrading;
      v. altering the flow velocity of the feed stream or any intermediate stream derived therefrom during the upgrading;
      vi. diluting the feed stream with a second feed stream that has a lower CI, where the diluting occurs at a ratio such that the CI of the resulting mixture is below the CI action threshold value, wherein the second feed stream comprises a second heavy petroleum fraction comprising a boiling point range that is the range from 343° C. to 566° C.;
      vii. visbreaking the feed stream prior to the upgrading.

2. The process of claim 1, wherein the heavy petroleum fraction comprises one or more of heavy gas oil, vacuum gas oil, coker gas oil and cycle oil.

3. The process of claim 1, wherein the aromatic condensation index action threshold value is larger than 0.211.

4. The process of claim 1, wherein the aromatic condensation index action threshold value is in the range from 0.211 to 0.295.

5. The process of claim 1, wherein the conventional $^{13}$C nuclear magnetic resonance spectroscopy with inverse gated $^1$H decoupling is performed without signal enhancement by nuclear Overhauser effect.

6. The process of claim 1, wherein the upgrading comprises at least one of hydrotreating, hydrocracking and catalytic cracking.

* * * * *